March 1, 1938.  H. GUTKAISS  2,109,637
AUTOMATIC SLACK ADJUSTER
Filed Aug. 18, 1936  4 Sheets-Sheet 1
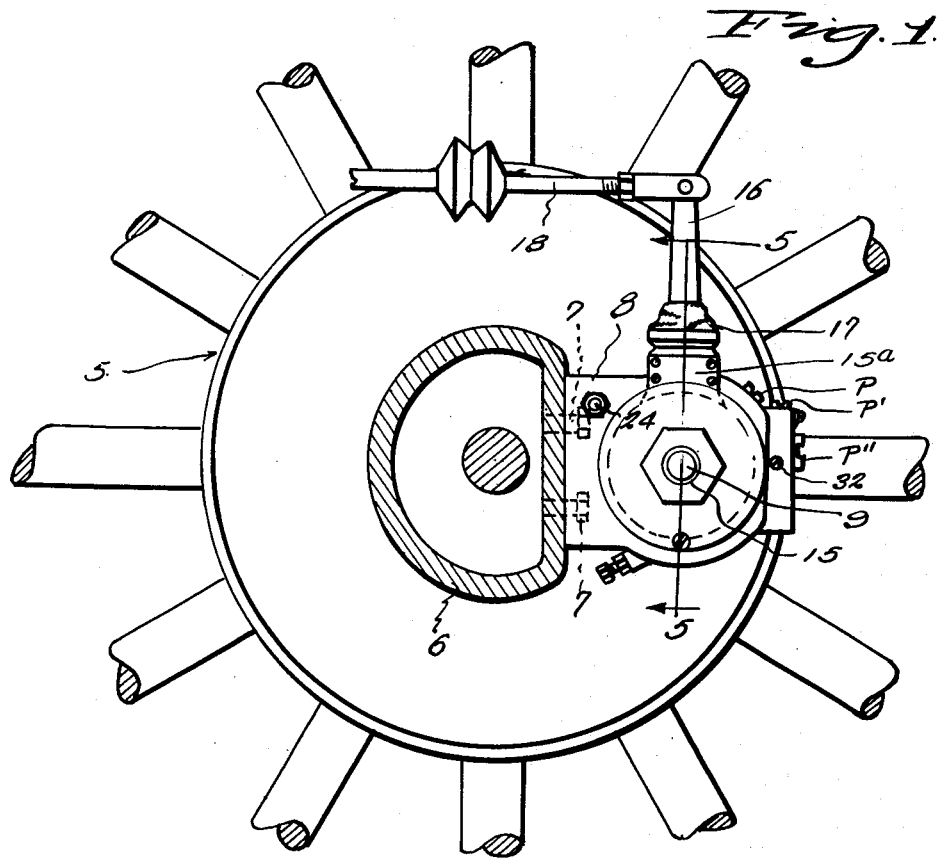
Fig. 1.
Fig. 12.
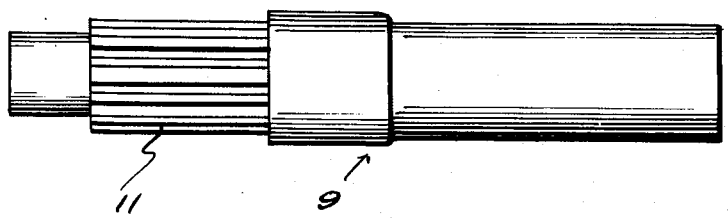
Inventor
Harry Gutkaiss
By Clarence A. O'Brien and Hyman Berman Attorneys

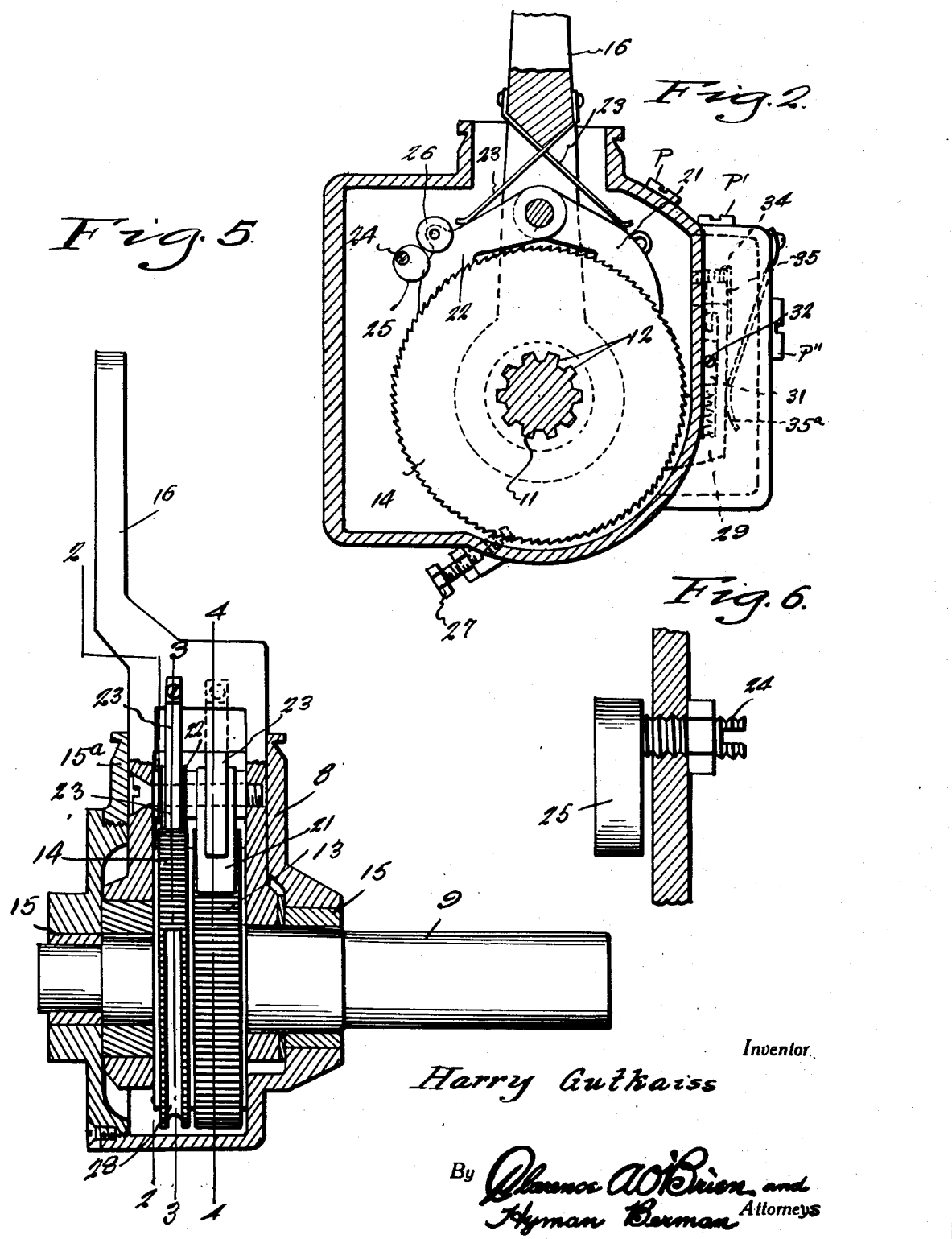

March 1, 1938.  H. GUTKAISS  2,109,637
AUTOMATIC SLACK ADJUSTER
Filed Aug. 18, 1936   4 Sheets-Sheet 3
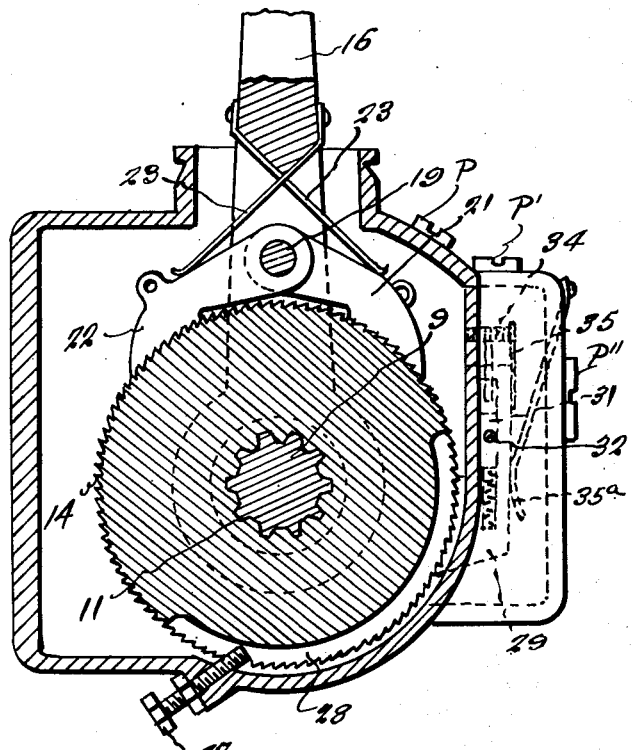
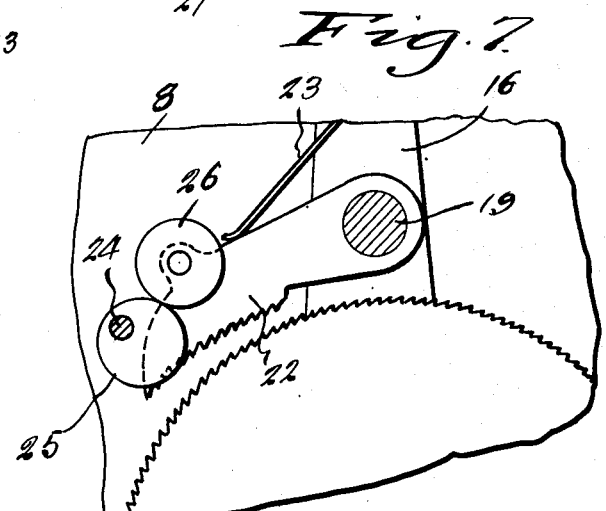
Inventor
Harry Gutkaiss
By Clarence A. O'Brien and
Hyman Berman
Attorneys March 1, 1938. H. GUTKAISS 2,109,637
AUTOMATIC SLACK ADJUSTER
Filed Aug. 18, 1936 4 Sheets-Sheet 4
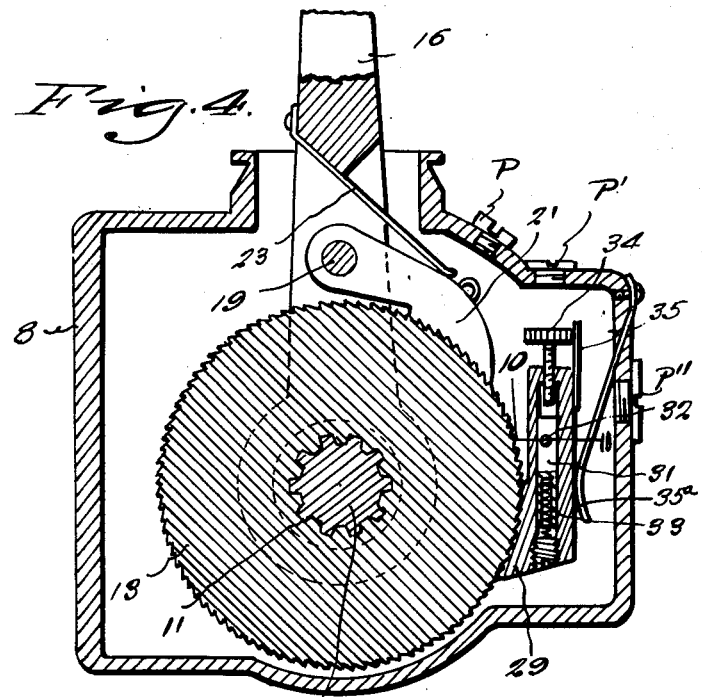
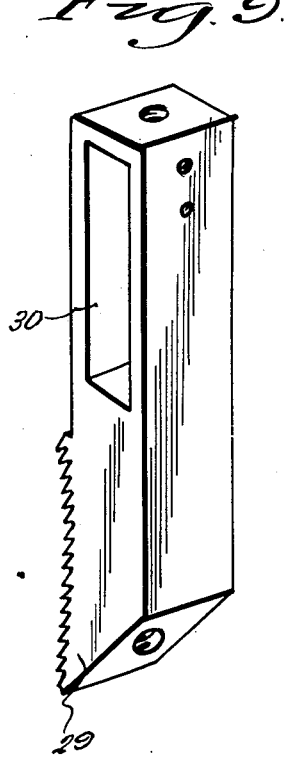
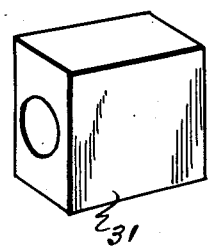
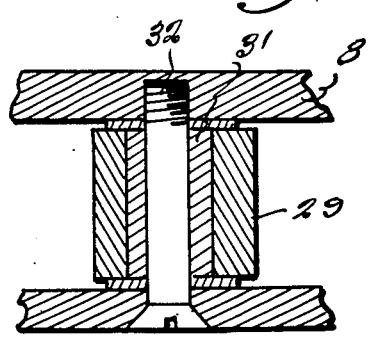
Inventor
Harry Gutkaiss Patented Mar. 1, 1938

2,109,637

UNITED STATES PATENT OFFICE 2,109,637

AUTOMATIC SLACK ADJUSTER

Harry Gutkaiss, Montgomery, N. Y.

Application August 18, 1936, Serial No. 96,685

4 Claims. (Cl. 188—196)

This invention relates to automatic slack adjusters, and more particularly to a slack adjuster adapted for use in connection with vehicular wheel brakes.

An object of the present invention is to provide a slack adjuster particularly designed for use with air brakes to the end that such brakes will be in proper adjustment at all times.

The invention together with its objects and advantages will be best understood from a study of the following description taken in connection with the accompanying drawings wherein:—

Figure 1 is an elevational view illustrating the application of the invention.

Figures 2, 3, and 4 are detail sectional views taken substantially on the lines 2—2, 3—3, and 4—4 respectively of Figure 5.

Figure 5 is a detail sectional view taken substantially on the line 5—5 of Figure 1.

Figure 6 is a fragmentary detail sectional view showing the manner of mounting an eccentric member.

Figure 7 is a fragmentary detail view partly in section and partly in elevation showing the purpose of the eccentric member above referred to.

Figure 8 is a vertical sectional view through the toothed wheels.

Figure 9 is a perspective view of a vertically shiftable dog.

Figure 10 is a detail sectional view taken substantially on the line 10—10 of Figure 4.

Figure 11 is a perspective view of a fixed guide block and

Figure 12 is a plan view of a conventional cam shaft.

Referring to the drawings by reference numerals, it will be seen that a conventional vehicular wheel brake is indicated generally by the reference numeral 5. This brake is preferably of the air brake type. Suitably mounted on the axle housing 6 of the vehicle and secured to the axle housing as at 7 is a casing 8.

A cam shaft 9 is provided with keys 11 that are received in guides or ways 12 provided internally of the hubs of toothed wheels 13 and 14, respectively. As will be clear from a study of Figures 3 and 4, the teeth of the wheels 13 and 14 are reversely directed relative to one another.

The cam shaft 9 has portions thereof suitably journaled in bearings 15 provided therefor on the housing 8 as shown in Figure 5 and said housing is also provided at the top thereof with a neck 14 that accommodates the leg portions of the fork 16, the legs of which fork at the ends thereof are suitably provided to accommodate the shaft 9 so that the fork 16 is mounted to rotate about the shaft 9 as an axis.

Suitably associated with the neck 15a of the casing is a dust protector 17 of any suitable structure and material.

The lever 16 at one end is connected with the usual brake rod 18 in the usual manner.

Pivotally associated with the lever 16 between the legs thereof as at 19 are oppositely directed dogs 21, 22 that have toothed ends normally engaged with the teeth of the wheels 13 and 14, respectively, through the medium of suitably provided springs 23 (see Figures 3 and 4). The springs 23 as shown in Figure 3 are suitably connected at one end to the fork 16.

It will be understood that one end of the shaft 9 extends into the brake drum 5 and is equipped with a cam (not shown) that is operated to expand the brake shoes or brake band (not shown) so that braking action is secured by frictional engagement by the brake shoes with the brake drum.

Suitably secured on one side wall of the casing 8 through the medium of bolt and nut means 24 is an eccentric or cam disk 25 with which is cooperable a roller 26 suitably mounted on and provided adjacent the toothed end of the dog 22 for raising the toothed end of the dog 22 out of engagement with the toothed wheel 14 as shown in Figure 7 as the brake is released and for holding the dog 22 in raised position as long as the brake remains released. In Figure 7 lever 16 is shown in a brake-released position.

It will thus be seen that in applying the vehicular wheel brake the lever 16 is caused to swing in a clockwise direction from the position shown in Figure 7 to substantially the position shown in either Figure 2 or Figure 3. Movement of the lever 16 to the position shown in either Figure 2 or Figure 3, which is a brake-applying position, is transmitted through the engagement of the dog 21 with the toothed wheel 13 for rotating the cam shaft 9 in a clockwise direction to turn the cam associated therewith in a proper direction for forcing the brake shoes into frictional contact with the drum of the brake for applying a braking action to the vehicle wheel.

Upon release of the vehicular wheel brake lever 16 moves in a reverse direction, that is to say, in a counterclockwise direction from the position shown in either Figure 2 or Figure 3 to the position shown in Figure 7, which will of course cause the shaft 9 to turn in a corresponding direction for releasing the brake shoes and permitting the same to move out of frictional contact with the brake drum. In this connection it will be appreciated that as the lever 16 moves to a brake releasing position roller 26 on the dog 22 will engage the cam 25 to raise the dog 22 to the position shown in Figure 7 and out of engagement with the toothed wheel 14, the dog 22 remaining in the raised position shown in Figure 7 as long as the vehicular wheel brake remains in a released condition. In this connection, it will of course be understood that the return movement of the lever 16 is transmitted to the shaft 9 for releasing the brake through the medium of the dog 22 engaging the toothed wheel 14, the movement of the dog 22 out of engagement with the toothed wheel 14 taking place substantially simultaneously with, or slightly prior to the complete release of the vehicular wheel brake.

Thus, it will be appreciated that the dog 22 and wheel 14 provide for a positive return of the brake cam to a brake releasing position precluding the possibility of the cam becoming stuck in applied position.

As is also thought to be apparent, the above instrumentalities and arrangement thereof provide for the permitting of the dog 21 to ratchet one tooth relative to the wheel 13 incidental to a return of the lever 16 to a brake releasing position and as wear on the brake lining takes place. Thus, it will be seen that the extent of movement of lever 16 to brake applying position will not at any time, regardless of the wear on the brake lining, be in excess of that movement of the lever to brake applying position when the brake lining is unworn or in good condition.

To take up excess slack in the brake mechanism there is also provided a dog 29 of the shape and construction shown in Figure 9. The dog 29 has a toothed portion engageable with the toothed wheel 13, and a hollow shank portion 30 which accommodates a block 31 which latter, as shown in Figure 10, is pivoted on a bolt 32. It will thus be seen that the dog 29 is mounted for swinging movement with the block 31 about the bolt 32 as a pivot and also for vertical sliding movement relative to the block 31.

For normally urging the dog 29 downwardly relative to the block 31, a suitable adjustable spring device 33 is inserted in the bottom or lower end of the dog 29 as shown in Figure 4, to bear against the lower edge of the block 31.

Also, for regulating the relative movement between the dog 29 and the block 31, there is provided an adjustment screw 32 that is threaded through the top of the dog 29 and has its inner end arranged to engage the block 31 to limit the downward movement of the dog 29 relative to said block.

For securing the screw 32 at the desired position of adjustment, there is suitably secured to one side of the dog 29 adjacent its upper end a spring 35 which engages the knurled knob of the screw 34 as also shown in Figure 4.

Also, for urging the toothed end of the dog 29 into engagement with the teeth of the wheel 13, there is provided a suitably anchored leaf spring 35a that bears against the dog 29 in a manner clearly shown in Figure 4.

From the above it will be seen that when the lever 16 is rocked in a clockwise direction for applying the brake and wheel 13 turns therewith in a manner hereinbefore explained, dog 29 being engaged with the teeth of wheel 13 will move downwardly and the movement of the dog 29 with the wheel 13 will be limited by the engagement of the inner end of the adjusting screw 34 with the block 31. The amount of movement of the dog 29 with the wheel 13 relative to the block 31 will be substantially equal to the movement of the lever 16 necessary to apply the brake.

If and when the amount of movement or the extent of rotation of the lever 16 and wheel 13 necessary to actuate the brake is greater than the adjusted space between the block 31 and the inner end of the screw 34, this excess movement of the wheel 13 will cause the dog 29 to ratchet one tooth on the wheel 13. Thus, upon return of the lever 16 to a brake releasing position, the rotation of the gear 13 in the direction required incidental to a return of the lever 16 will be arrested to the extent of permitting the dog 21 to ratchet one tooth on the wheel 13 as the lever 16 reaches its full release or "off" position. Thus, in this manner is excess slack in the brake bands or linings compensated for. Thus, it will be seen that whenever the wear on the brake lining is such as to cause the dog 29 to ratchet one tooth on the wheel 13, dog 21, on movement of the lever 16 to a released position, will ratchet one tooth on the wheel 13. Consequently, through the medium of this invention there is secured at all times a constant stroke in length and position or movement of the lever 16 irrespective of the progressive wear of the shoes or brake lining.

It is well known that a brake shoe expanding cam is made in such a manner that it can travel too far and turn completely over, which will lock the wheel fast and many times cause the brake bands to overheat. This takes place especially when the lining is worn and the brakes are in need of attention. In order to prevent this possibility, I have provided a stop screw 27 threaded through the bottom of the casing 8 as shown in Figure 3, and having an inner end working in a groove 28 provided in the periphery of the gear or toothed wheel 14 in a manner to abut one end wall of the groove 28 for limiting the rotative movement of the wheel 14 and associated parts and thereby prevent a complete "turn-over" of the brake cam and consequently positively insure against overheating of the worn brake lining. Thus, when the lining has become so worn as to permit the screw 27 to come into play in a manner just described, the operator of the vehicle will know that the brakes are badly in need of attention.

Also, to provide access to the dog 21 within the casing 8 for any purpose, as for example to raise the dog 21 out of engagement with the toothed wheel 13, there is provided in the top of the casing 8 in proximity to the dog 21 an opening for the insertion therethrough of a screw driver or similar tool. For this opening there is provided a plug P as shown.

Also, to permit access to be had to the adjusting screw 34 for adjusting the latter and to lubricate the same if desired, there is provided in the side of the casing 8 and suitably positioned relative to the dog 29 a suitable opening for which there is provided a plug P'.

Other details of construction may be mentioned, as for example, the housing 8 may be heavier at the side thereof bolted to the axle housing to increase the strength of the housing at this point.

Also, suitable lubricant fittings may be associated with the bearings 15, which fittings may be in the form of grease cups or the like, and the casing 8 may be fluid-tight so as to contain a bath of oil or other lubricants to a level approximating the shaft 9.

It is thought that a clear understanding of the construction, utility, and advantages of an invention of this character will be had without a more detailed description.

Having thus described the invention, what is claimed as new is:

1. In a slack adjuster, the combination with a rotatable shaft, means operable by said shaft for applying a vehicular wheel brake, and a brake fork for rotating said shaft, of a pair of ratchet wheels secured to said shaft, pivoted dogs carried by said fork and engaging the ratchet wheels and movable with the brake lever, means in the path of one of the dogs for moving the latter out of engagement with its ratchet wheel incidental to a movement of the fork to a brake releasing position, and additional dog means effective upon wear of the brake lining to engage with the other of the ratchet wheels for holding the same in advance angular position incidental to a return movement of said fork.

2. In a slack adjuster, the combination with a rotatable shaft, means operable by said shaft for applying the brakes, and a fork for rotating the shaft, of a pair of ratchet wheels secured to said shaft, dogs pivotally carried by said fork and engaging said ratchet wheels, a fixed cam member arranged in the path of one of said dogs, means on said one dog engageable with said cam member for moving said one dog out of engagement with its ratchet wheel incidental to a movement of the fork to a brake releasing position, and additional dog means effective upon wear of the brake lining to engage with the other of the ratchet wheels for holding the same against retrograde rotation relative to a return movement of the fork whereby to permit the dog associated with the last-named ratchet wheel to ratchet one tooth so that the amount of movement of the fork need never be in excess of the movement thereof when the lining is unworn.

3. In a slack adjuster, the combination with a rotatable shaft, means operable by said shaft for applying the brakes, and a fork for rotating said shaft, of a pair of ratchet wheels secured to said shaft, dogs carried by said fork and engaging said ratchet wheels for effecting a rotative movement of the ratchet wheels, means for engaging and holding one of the dogs out of engagement with its ratchet wheel upon movement of the fork to a brake releasing position, and additional dog means for engaging and holding the other of the ratchet wheels in an advance position upon movement of the fork and said ratchet wheels in excess of a predetermined amount.

4. In a slack adjuster, the combination with a rotatable shaft, of a pair of ratchet wheels rotatable with said shaft, the teeth of the ratchet wheels being reversely directed relative to one another, a brake applying fork engaged with the shaft to rotate about the shaft as an axis, a dog pivotally connected at one end with said fork and engageable with the teeth of one of said ratchet wheels, a second dog pivotally engaged with said fork and engageable with the teeth of the other ratchet wheel, means arranged in the path of the first-named dog for moving the latter out of engagement with its ratchet wheel incidental to a movement of the fork to a position for releasing the brakes, a dog mounted for sliding movement in a plane tangential to the second ratchet wheel with the rotative movement of said fork and adapted to ratchet over one tooth on the ratchet wheel when rotative movement of the latter exceeds a predetermined amount, supporting means for the slidably mounted dog, and yieldable means normally urging the slidably mounted dog in one direction.

HARRY GUTKAISS.